(12) United States Patent
Becka et al.

(10) Patent No.: US 10,550,930 B2
(45) Date of Patent: Feb. 4, 2020

(54) PLANET CARRIER ARRANGEMENT, VERTICAL MILL GEARBOX AND VERTICAL MILL

(71) Applicant: Siemens Aktiengesellschaft, München (DE)

(72) Inventors: Simon Becka, Essen (DE); Steffen Brun, Borken (DE); Matthias Friedrich, Bocholt (DE); Guido Josten, Bocholt (DE); Christoph Messink, Bocholt (DE); Robert Prusak, Gelsenkirchen (DE); Eugen Schlegel, Oberhausen (DE); Franz Schmeink, Bocholt (DE); Dirk Schroer, Rhede (DE); Michael Tegelkamp, Bocholt (DE)

(73) Assignee: FLENDER GMBH, Bocholt (DE)

( * ) Notice: Subject to any disclaimer, the term of this patent is extended or adjusted under 35 U.S.C. 154(b) by 11 days.

(21) Appl. No.: 16/024,177

(22) Filed: Jun. 29, 2018

(65) Prior Publication Data

US 2019/0003573 A1 Jan. 3, 2019

(30) Foreign Application Priority Data

Jun. 30, 2017 (EP) ..................................... 17179080

(51) Int. Cl.
*F16H 57/08* (2006.01)
*B02C 15/00* (2006.01)
*F16C 23/08* (2006.01)
*F16C 19/38* (2006.01)
*F16H 1/46* (2006.01)
*F16H 37/04* (2006.01)
(Continued)

(52) U.S. Cl.
CPC ......... *F16H 57/082* (2013.01); *B02C 15/006* (2013.01); *B02C 15/007* (2013.01); *F16C 19/38* (2013.01); *F16C 23/086* (2013.01); *F16H 1/46* (2013.01); *F16H 37/041* (2013.01); *F16C 19/30* (2013.01); *F16C 19/54* (2013.01); *F16C 2361/61* (2013.01)

(58) Field of Classification Search
None
See application file for complete search history.

(56) References Cited

U.S. PATENT DOCUMENTS 2,460,810 A * 2/1949 Davidson ............... B66O 23/84
384/591
4,468,985 A 9/1984 Nilsson
5,616,098 A 4/1997 Katayama et al.
(Continued)

FOREIGN PATENT DOCUMENTS

CH 636937 A5 6/1983
DE 102010028028 A1 10/2011
(Continued)

*Primary Examiner* — Justin Holmes
(74) *Attorney, Agent, or Firm* — Henry M. Feiereisen LLC

(57) ABSTRACT

A planet carrier arrangement includes a bearing assembly having first and second roller bearings and a traction element having a first end supported by the bearing assembly such as to enable the traction element to oscillate. A planet carrier is mounted in a suspended manner to the traction element, wherein one of the roller bearings of the bearing assembly is configured to absorb an axial force seeking to lift the planet carrier.

20 Claims, 3 Drawing Sheets

(51) Int. Cl.
 *F16C 19/30* (2006.01)
 *F16C 19/54* (2006.01)

(56) References Cited

U.S. PATENT DOCUMENTS

| | | | |
|---|---|---|---|
| 8,834,312 | B2 | 9/2014 | Kücükyavuz et al. |
| 9,062,711 | B2 | 6/2015 | Hofmann et al. |
| 9,951,859 | B2 | 4/2018 | Becka |
| 10,012,306 | B2 * | 7/2018 | Naruoka ............. F16H 57/0456 |
| 2011/0269554 | A1 * | 11/2011 | Minegishi ............. F03D 7/0204 |
| | | | 464/41 |
| 2016/0153545 | A1 | 6/2016 | Kucukyavuz et al. |
| 2016/0230842 | A1 | 8/2016 | Brun et al. |
| 2016/0375442 | A1 | 12/2016 | Kücükyavuz et al. |
| 2017/0080799 | A1 | 3/2017 | Messink et al. |

FOREIGN PATENT DOCUMENTS

| | | |
|---|---|---|
| DE | 102013212464 A1 | 12/2014 |
| EP | 2816246 A1 | 12/2014 |

* cited by examiner

PLANET CARRIER ARRANGEMENT, VERTICAL MILL GEARBOX AND VERTICAL MILL

CROSS-REFERENCES TO RELATED APPLICATIONS

This application claims the priority of European Patent Application, Serial No. 17179080.1, filed Jun. 30, 2018, pursuant to 35 U.S.C. 119(a)-(d), the disclosure of which is incorporated herein by reference in its entirety as if fully set forth herein.

BACKGROUND OF THE INVENTION

The present invention relates to a planet carrier arrangement which is part of a planetary gear stage in a gearbox. The invention also relates to a vertical mill gearbox in which the planet carrier arrangement according to the invention is installed. The invention likewise relates to a vertical mill which is equipped with such a vertical mill gearbox.

The following discussion of related art is provided to assist the reader in understanding the advantages of the invention, and is not to be construed as an admission that this related art is prior art to this invention.

A disadvantage of known planet carrier arrangements is that they are subject to high levels of wear. In addition, there is a need for a planetary gear arrangement that can move in an oscillating manner, i.e. radially, during operation.

It would therefore be desirable and advantageous to address prior art shortcomings.

SUMMARY OF THE INVENTION

According to one aspect of the present invention, a planet carrier arrangement includes a bearing assembly including first and second roller bearings, a traction element having a first end supported by the bearing assembly such as to enable the traction element to oscillate, and a planet carrier mounted in a suspended manner to a second end of the traction element, wherein one of the roller bearings of the bearing assembly is configured to absorb an axial force seeking to lift the planet carrier.

A planet carrier arrangement according to the present invention forms part of a planetary gear stage designed as a component of a gearbox. The planet carrier is rotatable about a principal axis of rotation and accommodates at least one planet gear. The planet carrier is suspended from a casing of the gearbox via the traction element. For this purpose the traction element is connected to the planet carrier at a second end. The opposite first end of the traction element is accommodated in a bearing assembly so as to be able to oscillate. The traction element is basically implemented as a rod or tube and in a sufficiently fixed manner to take the weight of the planet carrier. The ability of the traction element to oscillate is to be understood as meaning that a radial force acting on the first end of the traction element produces a radial deflection of the traction element, the bending stresses occurring in the traction element being essentially negligible. The bearing assembly has a least one first and one second roller bearing in which the traction element is accommodated.

In accordance with the present invention, at least one of the roller bearings in the bearing assembly is designed to absorb an axial force which lifts the planet carrier. This is ensured by the type of bearing selected and/or the alignment of the at least one roller bearing. Designing one of the roller bearings to absorb an axial force lifting the planet carrier prevents the other roller bearing from lifting, i.e. the bilateral contact between the rolling elements thereof and the associated outer and inner ring is temporarily eliminated. As a result, intermittent separation of a roller bearing and the subsequent striking of outer ring, inner ring and rolling elements is prevented. This prevents excessive roller bearing wear, resulting in increased reliability and extending the useful life of the planet carrier arrangement.

According to another advantageous feature of the present invention, the first and second roller bearings can be disposed in an X-arrangement. An X-arrangement is to be understood as relating to a mutual alignment of the roller bearings whereby the rotation centers resulting from the alignment of the roller bearings are on facing sides of the roller bearings. Because of the X-arrangement, the second roller bearing which is disposed above the first roller bearing is designed to absorb the lifting axial force acting on the planet carrier. The lifting axial force therefore results in compressive loading of the rolling elements in the second roller bearing, so that temporary lifting, i.e. disconnection, of the inner ring, outer ring and the rolling elements in the first roller bearing are prevented. The X-arrangement of the roller bearings provides a particular degree of stability along the principal axis of rotation of the planet carrier and prevents excessive loading of the roller bearings.

According to another advantageous feature of the present invention, the first and second roller bearings can define rotation centers which lie at a common centering point. The rotation centers of the two bearings thus coincide, i.e. come together at a common point. This produces a centering point about which the traction element can oscillate radially. An oscillating movement of the traction element results in slight to negligible flexural loading of the traction element. The planet carrier can therefore move radially in relation to its principal axis of rotation. Being thus capable of oscillation, the planet carrier is able, in interaction with the planetary gears accommodated therein, to assume an orientation in which an advantageous, statically determinate equilibrium of forces is present. Reduced wear of the planetary gears, the bearing assemblies thereof in the planet carrier and in the planet carrier itself is thereby achieved. In particular, automatic optimum alignment of the planet carrier is achieved in its planetary gear stage, in which there is also reduced noise generation.

According to another advantageous feature of the present invention, the first and second roller bearings can be pretensioned against one another in an axial direction, i.e. along the principal axis of rotation. Pretensioning ensures that in every operating state the roller bearings are retained at their intended mounting location so that the roller bearings are prevented from separating. Wear-intensive stressing of the roller bearings is prevented. The pretensioning is advantageously realized via a pretensioning element disposed between the second roller bearing and a casing component, preferably a cover. The pretensioning element is advantageously accommodated coaxially on the traction element and is also essentially tubular. In the installed state, the pretensioning element is braced against the second roller bearing on one side and presses against the casing component at the opposite end. The casing component is detachably connected to the casing of the gearbox in which the claimed planet carrier arrangement is installed. The mounting of the casing component thus produces a defined pretensioning state between the roller bearings.

According to another advantageous feature of the present invention, a spacer sleeve can be disposed between the first and second roller bearings. By virtue of its corresponding length in the axial direction, the spacer sleeve is designed to set a defined axial distance between the roller bearings. Spacer sleeves can be precision-manufactured and provide a simple way of precisely adjusting e.g. the position of the rotation centers of the roller bearings with respect to one another. Thus, the position of the common centering point of the traction element can be set in a simple manner. This ensures that the claimed planet carrier arrangement has a high degree of freedom to oscillate which in turn allows advantageous operation of the associated gearbox.

According to another advantageous feature of the present invention, a one-piece bushing can be provided to accommodate the first and second roller bearings. The one-piece bushing can be integral with the casing of the gearbox in which the planet carrier arrangement is used. Such a one-piece bushing can be produced with high manufacturing precision e.g. by reworking of a cast component in a milling or turning process. A one-piece bushing also allows simple and quick mounting of the roller bearings.

According to another advantageous feature of the present invention, at least one of the first and second roller bearings can be implemented as a spherical roller thrust bearing, as a tapered roller bearing or as a deep-groove thrust ball bearing. In the case of roller bearings of this kind, the rotation center is outside the roller bearing, so that an X-arrangement having a common centering point can be produced. Such roller bearings also offer a high load bearing capacity in the axial direction and therefore offer a high degree of reliability and a long service life for the planet carrier arrangement. In addition, the roller bearings briefly outlined are cost-efficient. Alternatively, any roller bearing type having the above described characteristics can also be used. A combination of different roller bearing types can also be used in the claimed planet carrier arrangement. For example, a roller bearing type having high operating durability can be selected as the first roller bearing, whereas a roller bearing type designed to absorb high impact loading in the axial direction is used as the second roller bearing.

According to another advantageous feature of the present invention, the traction element can be implemented as a hollow shaft or as a solid shaft. In the traction element implemented as a hollow shaft, an operating fluid, e.g. a lubricating oil, can be transported directly or via additional pipework. This offers a high degree of spatial integration of different functions.

According to another aspect of the present invention, a vertical mill gearbox includes a casing, a bevel gear stage, and a planet carrier arrangement including a first planetary gear stage which is connected to the bevel gear stage and includes a planet carrier, with the planet carrier arrangement including a bearing assembly including first and second roller bearings, and a traction element having a first end supported by the bearing assembly such as to enable the traction element to oscillate, with the planet carrier mounted in a suspended manner to a second end of the traction element for attachment to the casing, wherein one of the roller bearings of the bearing assembly is configured to absorb an axial force seeking to lift the planet carrier.

The casing accommodates the first planetary gear stage which is coupled to a bevel gear stage. The bevel gear stage is in turn connected to a drive. The first planetary gear stage includes the planet carrier and is suspended from the casing by means of a traction element. The principal axis of rotation of the planet carrier and the traction element are disposed essentially coaxially. The traction element is connected to the planet carrier at a first end and mounted on the casing of the vertical mill gearbox at an opposite second end such that the planet carrier is essentially able to oscillate, i.e. is radially deflectable. In the vertical mill gearbox according to the invention, the traction element and the planet carrier are part of a planet carrier arrangement according to one of the embodiments outlined above. A vertical mill gearbox having such a planet carrier arrangement is suitable for absorbing axial forces which are counter to the weight of the planet carrier in the mounted state during operation. Such axial forces are caused, for example, by operating anomalies or handing during transportation. The lifting, i.e. temporary separation, of a roller bearing in which the traction element is accommodated is prevented by the planetary gear stage arrangement according to the invention. As a result, a vertical mill gearbox according to the invention exhibits reduced wear, provides increased reliability and permits longer maintenance intervals. Transportation is likewise facilitated, as additional protection measures for axial locking of the traction element during transportation can be dispensed with. This altogether makes for easier putting into service of a vertical mill equipped with the vertical mill gearbox according to the invention.

According to another advantageous feature of the present invention, the planet carrier arrangement can include a second planetary gear stage which is linked to the first planetary gear stage and is constructed to drive a grinding table of a vertical mill. The driving side of the second planetary gear stage is coupled to the driven side of the first planetary gear stage. Advantageously, a shaft connected to the first planet carrier can be used as a sun gear shaft. The sun gear shaft can be used in the second planetary gear stage as an input shaft. On the driven side, the second planetary gear stage is connected to a grinding table which is driven via the vertical mill gearbox. Consequently, the traction element attached to the planet carrier of the first planetary gear stage is essentially surrounded by the components of the second planetary gear stage. A two-stage vertical mill gearbox of this kind provides a particularly favorable reduction ratio and a high degree of reliability. In particular, even for gearboxes having a plurality of planetary gear stages, the planet carrier arrangement according to the invention allows the first planetary gear stage to be attached in a manner enabling it to oscillate and at the same time to be arranged in a compact manner in combination with the second planetary gear stage.

According to another advantageous feature of the present invention, the bevel gear stage can include a torsion shaft which is disposed between the bevel gear stage and one of the first or second planetary gear stages for torque transmission and mounted such as to enable the torsion shaft to oscillate. The torsion shaft meshes with the bevel gear stage. Depending on the design of the vertical mill gearbox, this can be the first or second planetary gear stage. The torsion shaft is designed to transmit torque from the bevel gear stage to the corresponding planetary gear stage and is mounted in a manner enabling it to oscillate. The ability to oscillate means that the end of the torsion shaft which meshes with the planetary gear stage can move radially in relation to the principal axis of rotation thereof. The ability to oscillate of the planet carrier of the first planetary gear stage and the torsion shaft means that backlash in the individual tooth systems in the first planetary gear stage is utilizable. During operation of the vertical mill gearbox, a statically determinate state can always be set in the first planetary gear stage. Statically overdeterminate states associated with mechanical constraints are therefore prevented. This allows low-wear and low-noise operation of the vertical mill gearbox.

According to still another aspect of the present invention, a vertical mill includes a grinding table, a vertical mill gearbox, and a drive motor connected to the vertical mill gearbox for driving the grinding table, the vertical mill gearbox including a casing, a bevel gear stage, and a planet carrier arrangement including a first planetary gear stage which is connected to the bevel gear stage and includes a planet carrier, with the planet carrier arrangement including a bearing assembly including first and second roller bearings, and a traction element having a first end supported by the bearing assembly such as to enable the traction element to oscillate, with the planet carrier mounted in a suspended manner to a second end of the traction element for attachment to the casing, wherein one of the roller bearings of the bearing assembly is configured to absorb an axial force seeking to lift the planet carrier.

The drive motor is designed to drive a grinding table of the vertical mill. Disposed between the drive motor and the grinding table is the vertical mill gearbox which reduces the speed of the drive motor and increases the torque applied to the grinding table. The vertical mill gearbox is implemented as outlined above. The technical advantages of the described vertical mill gearbox are realized to a particular extent in the case of a vertical mill.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
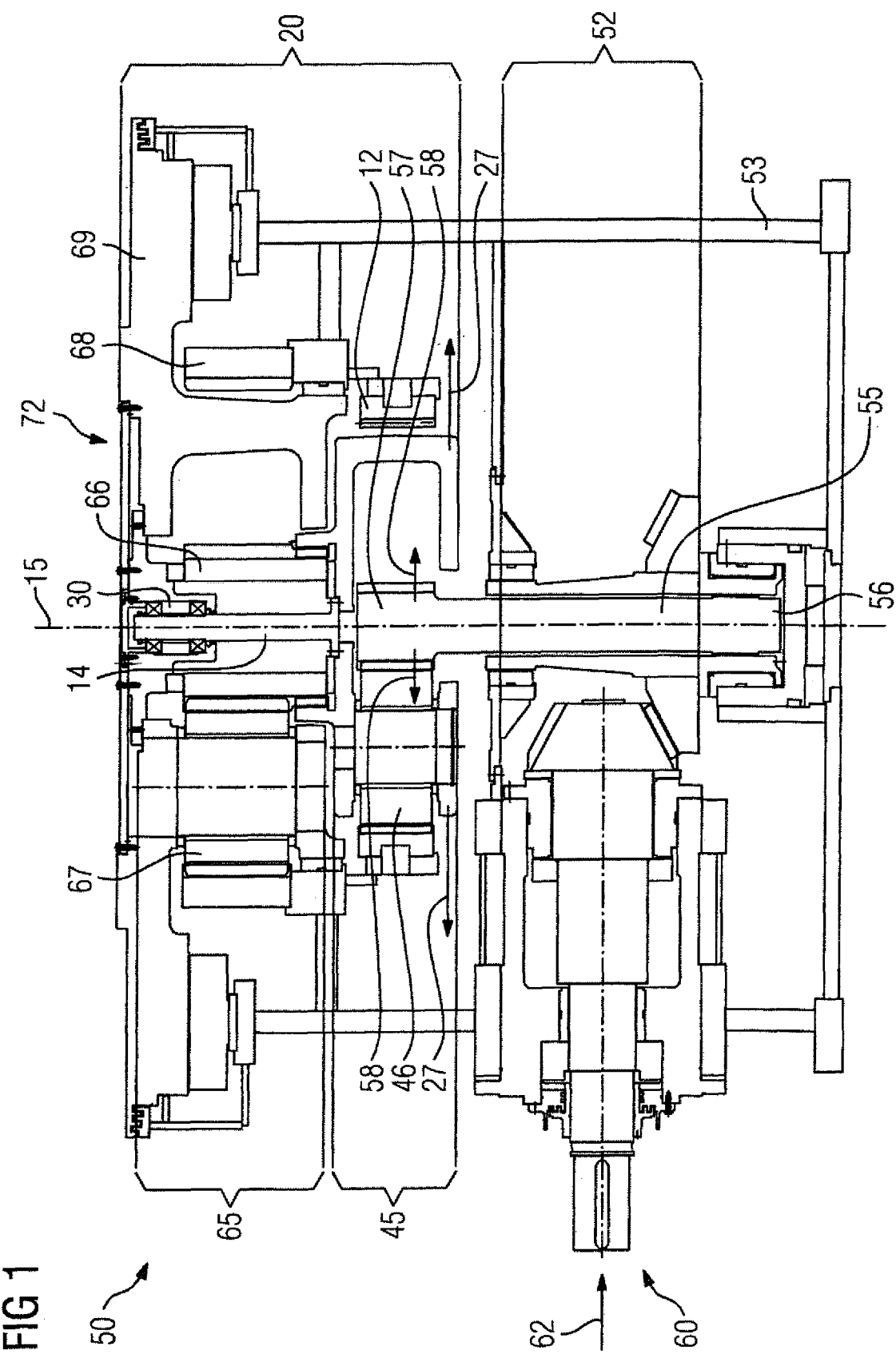
FIG. 1 is a schematic illustration of one embodiment of a vertical mill gearbox according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of one embodiment of a vertical mill gearbox according to the present invention, generally designated by reference numeral 50. The vertical mill gearbox 50 has a casing 53 and a drive motor 60 which is not shown in greater detail and supplies drive power 62 to the vertical mill gearbox 50. The drive power 62 is diverted into a vertical direction via a bevel gear stage 52. The bevel gear stage 52 has a torsion shaft 55 which is mounted in the region of a first end 56 so as to be able to oscillate. A specific construction of a type of a torsion shaft involved here is fully described in EP 17176001.0, the entire specification and drawings of which are expressly incorporated herein by reference. A second end 57 of the torsion shaft 55 is radially deflectable, in relation to a principal axis of rotation 15, during operation of the vertical mill gearbox 50. Corresponding radial deflections are indicated in FIG. 1 by the arrow 58. The second end 57 of the torsion shaft 55 meshes with a planet gear 46 of a first planetary gear stage 45. The planet gear 46 is in engagement with an internal gear 12 of the first planetary gear stage 45 and is rotatably accommodated in a planet carrier 10 of the first planetary gear stage 45. A sun gear shaft 66 of a second planetary gear stage 65 is non-rotatably connected to the planet carrier 10 of the first planetary gear stage 45 and meshes with a planet gear 67 of the second planetary gear stage 65. The planet gear 67 of the second planetary gear stage 65 is in turn in engagement with an internal gear 68 of the second planetary gear stage 65 and is designed to rotate the planet carrier 69 of the second planetary gear stage 65 during operation of the vertical mill gearbox 50. The planet carrier 69 is in turn used to drive a grinding table 70 not shown in greater detail.

The planet carrier 10 of the first planetary gear stage 45 forms part of a planet carrier arrangement 20 which includes a traction element 14 on which the planet carrier 10 of the first planetary gear stage 45 is mounted in a suspended manner so as to be able to oscillate. The ability of the planet carrier 10 of the first planetary gear stage 45 to oscillate allows radial deflection as indicated by the arrows 27. Due to the ability of the planet carrier 10 of the first planetary gear stage 45 to oscillate, the ability of the torsion shaft 55 to oscillate means that the planetary gear stages 45, 65 as a whole can move radially in relation to the principal axis of rotation 15. This allows a statically determinate state to be constantly achieved during operation for the planet gear 46 of the first planetary gear stage 45 and/or the planet gear 67 of the second planetary gear stage 65. A statically determinate state provides advantageous mechanical loading of the components involved and a high degree of running smoothness. By way of example, the planet carrier arrangement 20 will now be described in greater detail with reference to the embodiment according to FIG. 2.

Figure 2:
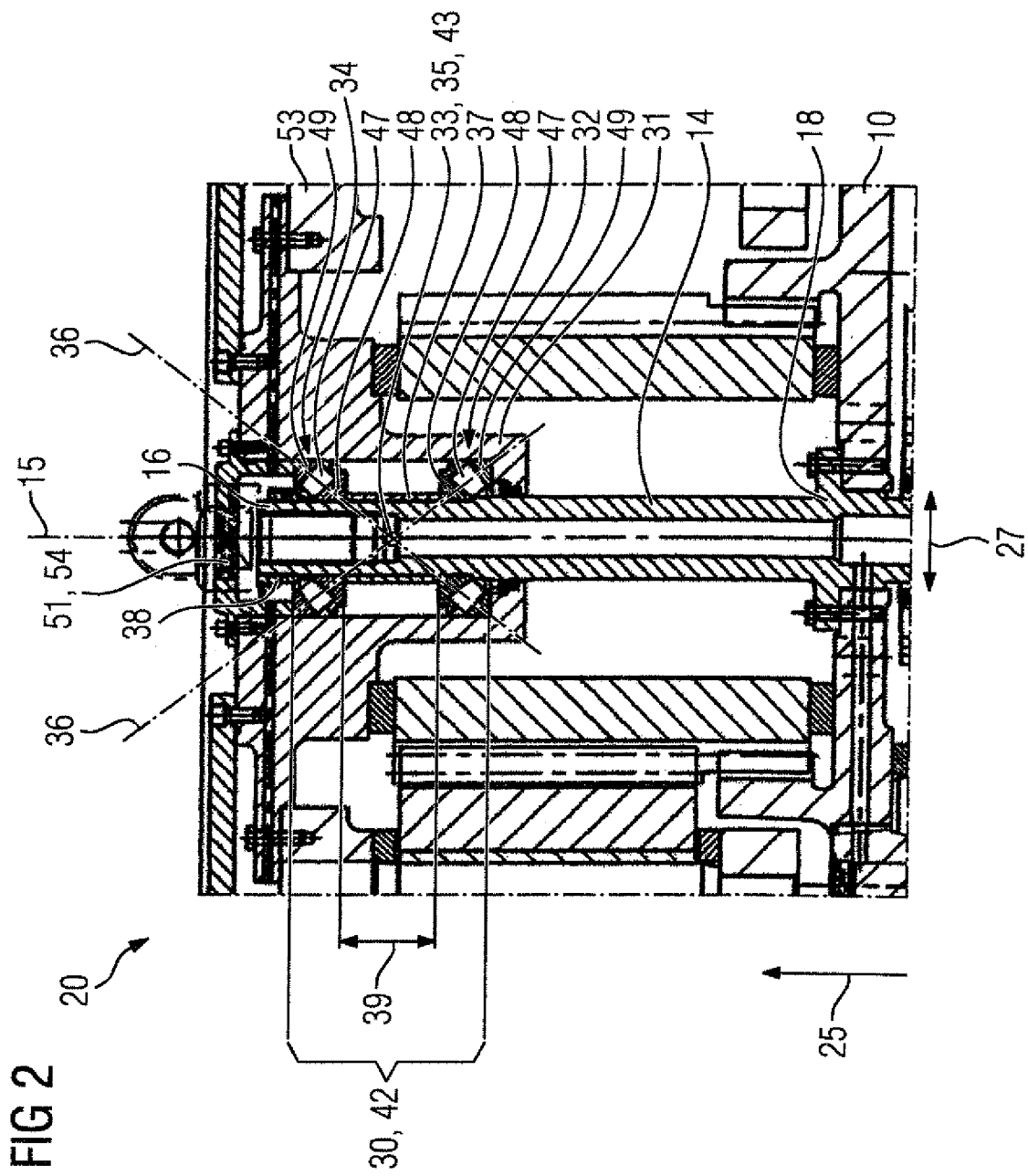
FIG. 2 is a longitudinal section of a planet gear arrangement according to the present invention for installation in a vertical mill gearbox according to the present invention.

FIG. 2 is a longitudinal section of a planet carrier arrangement 20 according to the present invention for installation, e.g., in a vertical mill gearbox 50 as shown in FIG. 1. FIGS. 1 and 2 are to be regarded as complementary in terms of expert basic knowledge. Accordingly, parts corresponding with those in FIG. 1 are denoted by identical reference numerals.

The planet carrier arrangement 20 includes a planet carrier 10 which is rotatably mounted about a principal axis of rotation 15. The planet carrier 10 also includes a traction element 14 which is implemented as a hollow shaft and is disposed coaxially to the principal axis of rotation 15. The traction element 14 is accommodated at a first end 14 in a bearing assembly 30 and is non-rotatably connected to the planet carrier 10 at a second end 18 so that rotation of the planet carrier 10 is transmitted to the traction element 14. The bearing assembly 30 includes a first roller bearing 32 and a second roller bearing 34 each implemented as spherical roller thrust bearings. The first and second roller bearings 32, 34 are accommodated in a one-piece bushing 31 which is connected to the casing 53. The roller bearings 32, 34 are at an axial distance 39 from one another which is set by a spacer sleeve 37 disposed between the roller bearings 32, 34. In addition, the orientations of the roller bearings 32, 34 are selected such that the roller bearings 32, 34 are in a so-called X-arrangement 42. Disposed on the second roller bearing 34 is a pretensioning element 38 by which the two roller bearings 32, 34 are pretensioned in the axial direction. For this purpose the pretensioning element 38, which is essentially implemented as a sleeve or bushing, is braced against the second roller bearing 34 and against a detachably mounted casing component 54 which is implemented as a cover 51.

In the X-arrangement 42 of the roller bearings 32, 34, the second roller bearing 34 is disposed such that it is suitable for absorbing an axial force 25 which is oriented toward lifting of the planet carrier 10. Such an axial force 25 can be caused by an irregularity in the operation of the planet carrier arrangement 20 or by transportation handling. The axial force 25 produces axial compressive loading of the second roller bearing 34. In combination with the pretension applied via the pretensioning element 38, lifting, i.e. separating of the first roller bearing 32, is therefore counteracted. Such lifting of the first roller bearing 32 involves increased wear. Each of the roller bearings 32, 34 has a rotation center 33, 35. The position of the rotation center 33, 35 results from the orientation of the rolling elements 47 which are in each case between an inner ring 48 and an outer ring 49 of the roller bearings 32, 34. The position of the rotation centers 33, 35 is designed on the basis of reference lines 36. In the X-arrangement 42, the axial spacing 39 of the roller bearings 32, 34 is set such that the rotation centers 33, 35 coincide, i.e. come together at a common point. This common point forms a centering point 43. Consequently, the traction element 14 can oscillate about the centering point 43, thus permitting radial deflection 27 of the traction element 14 during operation of the planet carrier arrangement 20. The planet carrier arrangement 20 according to FIG. 2 therefore prevents excessive wear on the first roller bearing 32 while at the same time enabling the planet carrier 20 to oscillate. In combination with the ability of the torsion shaft 55 according to FIG. 1 to oscillate, this makes automatic mutual alignment of the planetary gear stages 45, 65 possible, which in turn results in a preferred static loading state of the components thereof.

Figure 3:
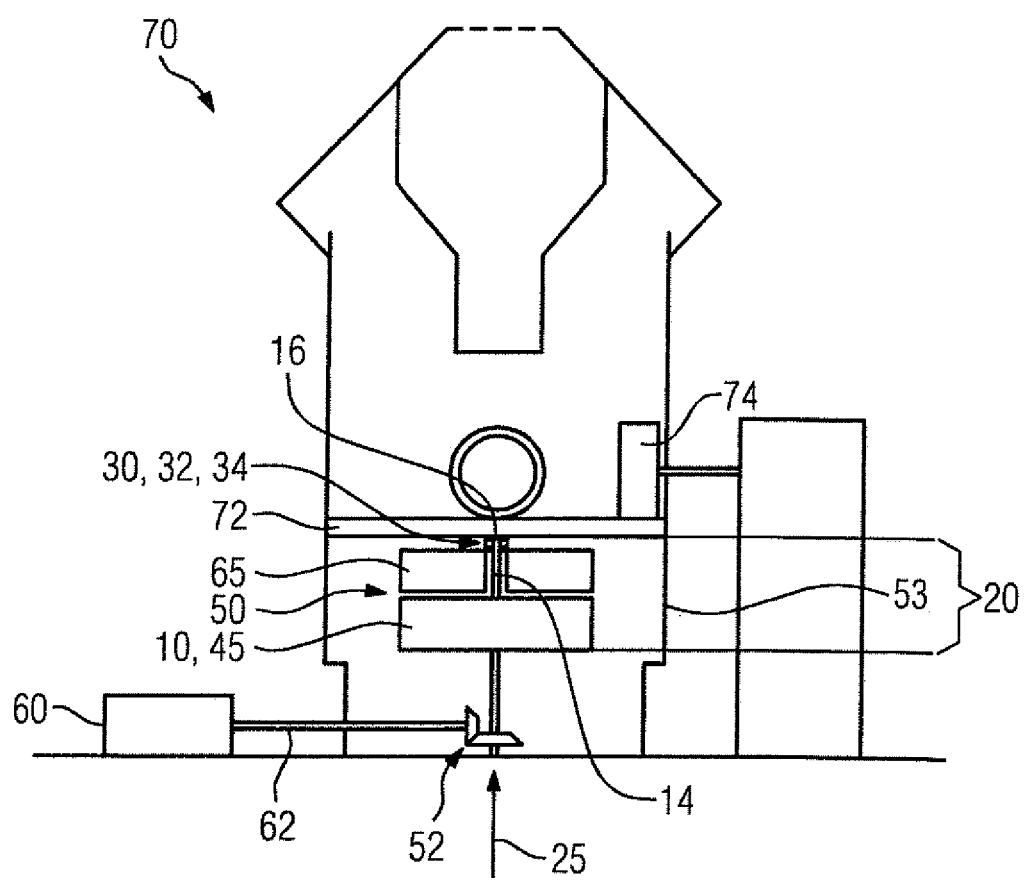
FIG. 3 is a schematic illustration of a vertical mill equipped with the vertical mill gearbox according to the present invention.

FIG. 3 schematically illustrates the design of a vertical mill 70 including a drive motor 60 via which the drive power 62 necessary for operation is provided. The drive motor 60 is linked to a vertical mill gearbox 50 which includes a bevel gear stage 52 and at least one first planetary gear stage 45. The drive motor 60 drives a grinding table 72 over the surface of which grinder rolling elements 74 run. The first planetary gear stage 45 incorporates a planet carrier 10. The planet carrier 10 of the first planetary gear stage 45 is connected to the casing 53 of the vertical mill gearbox 53 via a traction element 14 and is thus mounted in a suspended manner. The planet carrier 10 forms part of a planet carrier arrangement 20 which is designed according to an embodiment of the invention. At a first end 16 facing away from the planet carrier 10, the traction element 14 is rotatably accommodated in a bearing assembly 30 which includes two roller bearings 32, 34 which are disposed such that at least one of the roller bearings 32, 34 is suitable for absorbing an axial force 25 which is oriented toward lifting of the planet carrier 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A planet carrier arrangement, comprising:
   a bearing assembly including first and second roller bearings;
   a traction element having a first end supported by the bearing assembly such as to enable the traction element to oscillate; and
   a planet carrier mounted in a suspended manner to a second end of the traction element,
   wherein one of the roller bearings of the bearing assembly is configured to absorb an axial force seeking to lift the planet carrier.

2. The planet carrier arrangement of claim 1, wherein the first and second roller bearings are disposed in an X-arrangement.

3. The planet carrier arrangement of claim 1, wherein the first and second roller bearings define rotation centers which lie at a common centering point.

4. The planet carrier arrangement of claim 1, wherein the first and second roller bearings are pretensioned against one another.

5. The planet carrier arrangement of claim 4, further comprising a pretensioning element pressed against a casing component, in particular a cover, and configured to pretension the first and second roller bearings.

6. The planet carrier arrangement of claim 1, further comprising a spacer sleeve disposed between the first and second roller bearings.

7. The planet carrier arrangement of claim 1, further comprising a one-piece bushing configured to accommodate the first and second roller bearings.

8. The planet carrier arrangement of claim 1, wherein at least one of the first and second roller bearings is implemented as a spherical roller thrust bearing, as a tapered roller bearing or as a deep-groove thrust ball bearing.

9. The planet carrier arrangement of claim 1, wherein the traction element is implemented as a solid shaft or hollow shaft.

10. A vertical mill gearbox, comprising:
    a casing;
    a bevel gear stage; and
    a planet carrier arrangement including a first planetary gear stage which is connected to the bevel gear stage and includes a planet carrier, said planet carrier arrangement comprising a bearing assembly including first and second roller bearings, and a traction element having a first end supported by the bearing assembly such as to enable the traction element to oscillate, said planet carrier mounted in a suspended manner to a second end of the traction element for attachment to the casing, wherein one of the roller bearings of the bearing assembly is configured to absorb an axial force seeking to lift the planet carrier.

11. The vertical mill gearbox of claim 10, wherein the planet carrier arrangement includes a second planetary gear stage which is linked to the first planetary gear stage and is constructed to drive a grinding table of a vertical mill.

12. The vertical mill gearbox of claim 10, wherein the bevel gear stage includes a torsion shaft which is disposed between the bevel gear stage and one of the first or second planetary gear stages for torque transmission and mounted such as to enable the torsion shaft to oscillate.

13. The vertical mill gearbox of claim 10, wherein the first and second roller bearings are disposed in an X-arrangement.

14. The vertical mill gearbox of claim 10, wherein the first and second roller bearings define rotation centers which lie at a common centering point.

15. The vertical mill gearbox of claim 10, further comprising a pretensioning element pressed against a casing component, in particular a cover, and configured to pretension the first and second roller bearings against one another.

16. The vertical mill gearbox of claim 10, further comprising a spacer sleeve disposed between the first and second roller bearings.

17. The vertical mill gearbox of claim 10, further comprising a one-piece bushing configured to accommodate the first and second roller bearings.

18. The vertical mill gearbox of claim 10, wherein at least one of the first and second roller bearings is implemented as a spherical roller thrust bearing, as a tapered roller bearing or as a deep-groove thrust ball bearing.

19. The vertical mill gearbox of claim 10, wherein the traction element is implemented as a solid shaft or hollow shaft.

20. A vertical mill, comprising:
a grinding table;
a vertical mill gearbox; and
a drive motor connected to the vertical mill gearbox for driving the grinding table,
said vertical mill gearbox comprising a casing, a bevel gear stage, and a planet carrier arrangement including a first planetary gear stage which is connected to the bevel gear stage and includes a planet carrier, said planet carrier arrangement comprising a bearing assembly including first and second roller bearings, and a traction element having a first end supported by the bearing assembly such as to enable the traction element to oscillate, said planet carrier mounted in a suspended manner to a second end of the traction element for attachment to the casing, wherein one of the roller bearings of the bearing assembly is configured to absorb an axial force seeking to lift the planet carrier.

* * * * *